T. CANTLEY.
SHOVEL.
APPLICATION FILED FEB. 1, 1915.

1,184,821. Patented May 30, 1916.

WITNESSES

INVENTOR
T. CANTLEY.
BY
ATT'YS.

UNITED STATES PATENT OFFICE.

THOMAS CANTLEY, OF NEW GLASGOW, NOVA SCOTIA, CANADA.

SHOVEL.

1,184,821.   Specification of Letters Patent.   Patented May 30, 1916.

Application filed February 1, 1915. Serial No. 5,460.

*To all whom it may concern:*

Be it known that I, THOMAS CANTLEY, of the town of New Glasgow, Province of Nova Scotia, Dominion of Canada, have invented new and useful Improvements in Shovels, of which the following is a specification.

This invention relates to shovels and particularly refers to that type adapted for military use, and the objects of the invention are to permit of the shovel being used as a shield, to render the stem adjustable thereby permitting of the handle being used as an anchoring means and other objects which will be made clear hereafter, and it consists essentially of the improved shovel particularly described in the following specification and accompanying drawings forming part of the same.

Figure 1:
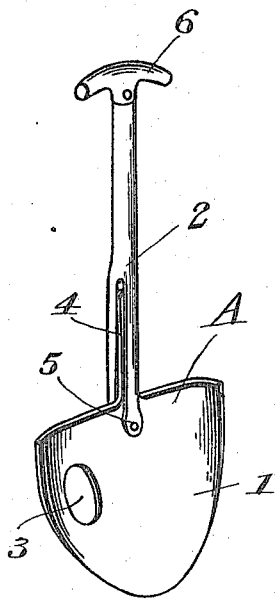
Figure 2:
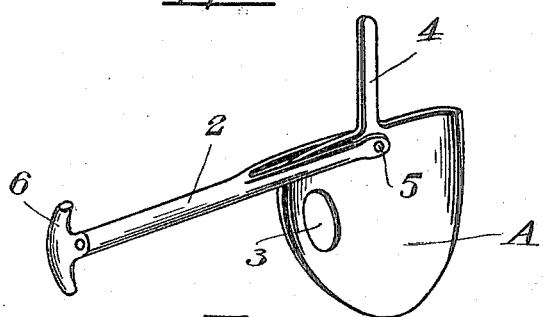
Figure 3:
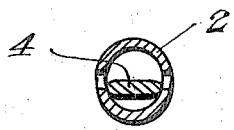

In the drawings: Figure 1 is a perspective view of the improved shovel. Fig. 2 is a perspective view of the shovel showing the stem adjusted to the horizontal position. Fig. 3 is a transverse section of the stem, showing the spike of the shovel located therein.

Like characters of reference refer to like parts in the several drawings.

Referring to the drawings, A represents the improved shovel comprising the blade 1 and the stem 2 pivotally mounted thereon. An orifice 3 extends through the blade which is further provided with a spike 4 formed at substantially right angles to the upper edge thereof, and integral therewith. This spike is substantially rectangular in cross section but has the corners preferably rounded, the object of which will be made clear hereafter.

The stem 2 is made of tubular resilient material such as spring steel, and is bifurcated at the lower end which end is pivotally attached to the blade 1 by the rivet or pin 5, the upper end of the said stem terminating in a suitable T-shaped handle 6. The stem 2 is offset slightly, to the blade 1 so that when the shovel is being used for entrenching or like purposes, the spike 4 is embraced by the bifurcated end of the said stem and securely locked therein. The locking is effected by springing the spike into the concavity of one side of the bifurcation of the stem.

When the shovel is to be used as a shield, the handle 6 is gripped firmly by the operator and a slight twist given to the stem 2, so that the groove of the bifurcated end registers with the rounded lateral edge of the spike 4 in which position the stem is free to be rotated about the rivet or pin 5.

When the stem 2 is rotated into a horizontal position, as shown in Fig. 2, the stem is again twisted so that the groove in the bifurcated end registers with the upper edge of the shovel when the stem is engaged therewith. In this position the spike 4 is designed to be pushed into the ground, the stem 2 lying along the surface and the handle 6 embedded in the ground, thereby anchoring the shield and giving greater stability to the same.

By making the stem of tempered spring steel, it will be seen that after twisting, the stem will return to its normal position without in any way impairing the same.

As many changes could be made in the above construction, and many apparently widely different embodiments of my invention within the scope of the claims, constructed without departing from the spirit or scope thereof, it is intended that all matter contained in the accompanying specification and drawings be interpreted as illustrative and not in a limiting sense.

What I claim as my invention is:

1. A shovel of the class described comprising a blade, a spike formed integral with the said blade, a resilient tubular stem pivoted to the blade and offset slightly therefrom, such stem being adapted to be sprung into locking engagement with said spike as and for the purpose specified.

2. A shovel of the class described comprising a blade, a spike formed integral with the said blade, a resilient tubular stem having a lower bifurcated end pivotally mounted to said blade and offset slightly therefrom, such stem being adapted to be sprung into locking engagement with the said spike as and for the purpose specified.

In witness whereof I have hereunto set my hand in the presence of two witnesses.

THOS. CANTLEY.

Witnesses:
 SADIE M. PETTIS,
 JEAN I. REID.

Copies of this patent may be obtained for five cents each, by addressing the "Commissioner of Patents, Washington, D. C."